US008270602B1

(12) United States Patent
Forman et al.

(10) Patent No.: US 8,270,602 B1
(45) Date of Patent: Sep. 18, 2012

(54) COMMUNICATION SYSTEMS, TRANSCEIVERS, AND METHODS FOR GENERATING DATA BASED ON CHANNEL CHARACTERISTICS

(75) Inventors: Michael A. Forman, Mountain House, CA (US); Derek Young, Fremont, CA (US)

(73) Assignee: Sandia Corporation, Albuquerque, NM (US)

( * ) Notice: Subject to any disclaimer, the term of this patent is extended or adjusted under 35 U.S.C. 154(b) by 374 days.

(21) Appl. No.: 12/642,415

(22) Filed: Dec. 18, 2009

Related U.S. Application Data

(60) Provisional application No. 61/233,517, filed on Aug. 13, 2009.

(51) Int. Cl.
*H04L 9/22* (2006.01)
*H04K 1/00* (2006.01)
(52) U.S. Cl. .................................. 380/44; 380/255
(58) Field of Classification Search ................ 380/44, 380/255
See application file for complete search history.

(56) References Cited

U.S. PATENT DOCUMENTS

| | | | | |
|---|---|---|---|---|
| 5,604,806 | A * | 2/1997 | Hassan et al. | 380/44 |
| 6,031,913 | A * | 2/2000 | Hassan et al. | 380/44 |
| 7,693,284 | B2 * | 4/2010 | Kloos | 380/270 |
| 2007/0036353 | A1 * | 2/2007 | Reznik et al. | 380/30 |
| 2007/0211902 | A1 * | 9/2007 | Newman et al. | 380/278 |
| 2007/0263736 | A1 | 11/2007 | Yuda | |
| 2008/0069251 | A1 | 3/2008 | Imai | |
| 2008/0304658 | A1 | 12/2008 | Yuda | |
| 2009/0011700 | A1 | 1/2009 | Nishio | |
| 2009/0022239 | A1 | 1/2009 | Kimura | |
| 2009/0028262 | A1 | 1/2009 | Imai | |
| 2009/0031183 | A1 | 1/2009 | Hoshino | |
| 2009/0034637 | A1 | 2/2009 | Hoshino | |
| 2009/0055701 | A1 | 2/2009 | Hoshino | |
| 2009/0060082 | A1 | 3/2009 | Yuda | |
| 2009/0093265 | A1 | 4/2009 | Kimura | |
| 2009/0116571 | A1 | 5/2009 | Imai | |
| 2009/0124210 | A1 | 5/2009 | Imai | |
| 2009/0225982 | A1 * | 9/2009 | Yener et al. | 380/44 |
| 2010/0128877 | A1 * | 5/2010 | Bloch et al. | 380/268 |

FOREIGN PATENT DOCUMENTS

WO    EP1775875    4/2007

OTHER PUBLICATIONS

Sayeed, Akbar and Adrian Perrig. "Secure Wireless Communications: Secret Keys Through Multipath", 2008.*
J. Meessen; C. Parisot; J-F. Delaigle; D. Nicholson; F. Dufaux; X. Duthu; A. Nix; C. Serrao; C. Lebarz; D. Bull; F-O. Devaux; Y. Sadourny; A. Doufexi; D. Agrafiotis; C. Tricot; Deliverable D2.1 State-of-the-Art / Multimedia and Video Surveillance Convergence:, Information Society Technologies, 2004, pp. 1-154.

(Continued)

*Primary Examiner* — Michael Simitoski
(74) *Attorney, Agent, or Firm* — Timothy P. Evans

(57) ABSTRACT

Examples of methods for generating data based on a communications channel are described. In one such example, a processing unit may generate a first vector representation based in part on at least two characteristics of a communications channel. A constellation having at least two dimensions may be addressed with the first vector representation to identify a first symbol associated with the first vector representation. The constellation represents a plurality of regions, each region associated with a respective symbol. The symbol may be used to generate data, which may stored in an electronic storage medium and used as a cryptographic key or a spreading code or hopping sequence in a modulation technique.

24 Claims, 14 Drawing Sheets

OTHER PUBLICATIONS

T. Aono; K. Higuchi; T. Ohira; B. Komiyama; H. Sasaoka; "Wireless Secret Key Generation Exploiting Reactance-Domain Scalar Response of Multipath Fading Channels", IEEE Transactions on Antennas and Propagation, Nov. 2005, vol. 53, No. 11, pp. 3776-3784.

B. Azimi-Sadjadi; A. Mercado; A. Kiayias; B. Yener; "Robust Key Generation from Signal Envelopes in Wireless Networks", Proceedings of the 14th ACM Conference on Computer and Communications Security, Jan. 2007.

M. A. Forman; D. Young; "A Generalized Scheme for the Creation of Shared Secret Keys through Uncorrelated Reciprocal Channels in Multiple Domains", 2009 Proceedings of the 18th International Conference on Computer Communications and Network, Aug. 3, 2009, pp. 1-8.

A. A. Hassan; W. E. Stark, J. E. Hershey; S. Chennakeshu; "Cryptographic Key Agreement for Mobile Radio", Digital Signal Processing, 1996, 6(0023), pp. 207-212.

J. E Hershey; A. A. Hassan; R. Yarlagadda; "Unconventional Cryptographic Keying Variable Management", IEEE Transactions on Communications, Jan. 1995, 43(1), pp. 3-6.

A. Kitaura; H. Sasaoka; A Scheme of Private Key Agreement Based on the Channel Characteristics of OFDM Land Mobile Radio, Electronics and Communications in Japan, Part 3, 2005, 88(9) pp. 1-10.

A Kitaura; H. Iwai; H. Sasaoka; "A Scheme of Secret Key Agreement Based on Received Signal Strength Variation by Antenna Switching in Land Mobile Radio", International Conference on Communication Technology, 2007, 3, pp. 1763-1767.

J. Meessen; C. Parisot; J-F. Delaigle, D. Nicholson; F. Dufaux; X. Duthu; A. Nix; C. Serrao; C. Lebarz; D. Bull: F-O. Devaux; Y. Sadourny, A. Doufexi; D. Agrafiotis; C. Tricot; "Deliverable D2.1 State-of-the-Art / Multimedia and Video Surveillance Convergence", Information Society Technologies, 2004, pp. 1-154.

T. Ohira, "Secret Key Generation Exploiting Antenna Beam Steering and Wave Propagation Reciprocity", Jan. 2005, European Microwave Conference, pp. 1-5.

M. A. Tope; J. C. McEachen; "Unconditionally Secure Communications Over Fading Channels", IEEE Military Communications Conference, Jan. 2001, pp. 54-58.

R. Vaughn; "Switched Parasitic Elements for Antenna Diversity", IEEE Transactions on Antennas and Propagation, Feb. 1999, 47(2), pp. 399-405.

R. Wilson; D. Tse; R. A. Scholtz; "Channel Identification: Secret Sharing Using Reciprocity in Ultrawideband Channels", IEEE Transactions on information Forensics and Security, Sep. 2007, 2(3), pp. 364-375.

T. Aono: K Higuchi; M. Taromaru, T, Ohira; H. Sasaoka, "Wireless Secret Key Generation Exploiting the Reactance-domain Scalar Response of Multipath Fading Channels : RSSI Interleaving Scheme", Wireless Technology, Jan. 2005, pp. 173-176.

* cited by examiner

COMMUNICATION SYSTEMS, TRANSCEIVERS, AND METHODS FOR GENERATING DATA BASED ON CHANNEL CHARACTERISTICS

CROSS-REFERENCE TO RELATED APPLICATIONS

This application claims the benefit of U.S. Provisional Application Ser. No. 61/233,517, filed Aug. 13, 2009, which application is hereby incorporated by reference in its entirety for any purpose.

STATEMENT REGARDING RESEARCH & DEVELOPMENT

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

TECHNICAL FIELD

Embodiments of the invention relate generally to communication systems, and particularly, examples are provided of the generation of private shared data based on measured channel information. The data may be used for cryptography or secure modulation.

BACKGROUND OF THE INVENTION

For a wireless communications link to be secure, it should generally provide data confidentiality and integrity during transmission. The principal method through which this is achieved is the use of cryptography, of which there are generally two types, public key and private key.

Public-key cryptography is a method for secret communication between two parties without the requirement of an initial exchange of secret keys. It employs a pair of keys, one private, which is held secret, and one public, which is distributed. Messages are encrypted with the recipient's public key and decrypted with the recipient's corresponding private key. Public-key cryptography is thus relatively unencumbered with key-exchange difficulties and key-interception vulnerabilities; however it is computationally intensive.

Private-key cryptography is a method for secret communication between two parties that requires an initial exchange of a single shared secret key. Messages are encrypted by the sender and decrypted by the recipient using this same shared key. Private-key cryptography is generally less computationally intensive than public-key cryptography; however key distribution and management may be problematic. Key distribution risks that the secret key will be intercepted during transmission. Key management requires the generation and transport of a different key for each communicating party.

Despite differing characteristics, both methods of cryptography require some form of key-distribution infrastructure responsible for either authenticating public keys or securely distributing private keys, or both. Because in some deployment scenarios such an infrastructure can be cost prohibitive or logistically impossible, several alternative methods of managing cryptographic keying variables have been proposed, including the use of the communications channel as a keying variable. Use of the communications channel as a keying variable may eliminate or reduce the need for a key-distribution infrastructure, in that private keys may be generated during communications, using shared physical information between two nodes.

However, existing methodologies that make use of the communications channel as a keying variable are limited to the use of a single aspect of the communications channel, and keys generated using existing techniques may not present a key of usable strength, as the variable relied on may be easily derived in some cases or the key generation technique may not be sufficiently robust to generate sufficiently random keys.

In other applications, shared data between nodes in a communications system may be used for secure modulation—such as a hopping sequence or spreading code. Similar difficulties are encountered in generating data for use as a sequence or spreading code.

DETAILED DESCRIPTION

Certain details are set forth below to provide a sufficient understanding of embodiments of the invention. However, it will be clear to one skilled in the art that embodiments of the invention may be practiced without one or more of these particular details. In some instances, well-known circuits, communication blocks, control signals, timing protocols, mathematical functions, and software operations may not have been shown in detail in order to avoid unnecessarily obscuring the described embodiments of the invention.

Examples of the present invention include systems, devices, and methods for the generation of data based on channel characteristics. The data may be shared private data between nodes in a communications system and may be used as a cryptographic key or for secure modulation, such as to generate a hopping sequence or spreading code in a secure modulation scheme.

Examples of the invention measure channel variability and complexity to cognitively optimize measurement and data-generation methods as well as estimate the randomness of the generated data for purposes of determining an expiration time of the generated data. Some examples may also monitor a spectrum for intentional or unintentional jammers and eavesdroppers and compensate for their presence, as will be described further below.

Figure 1:
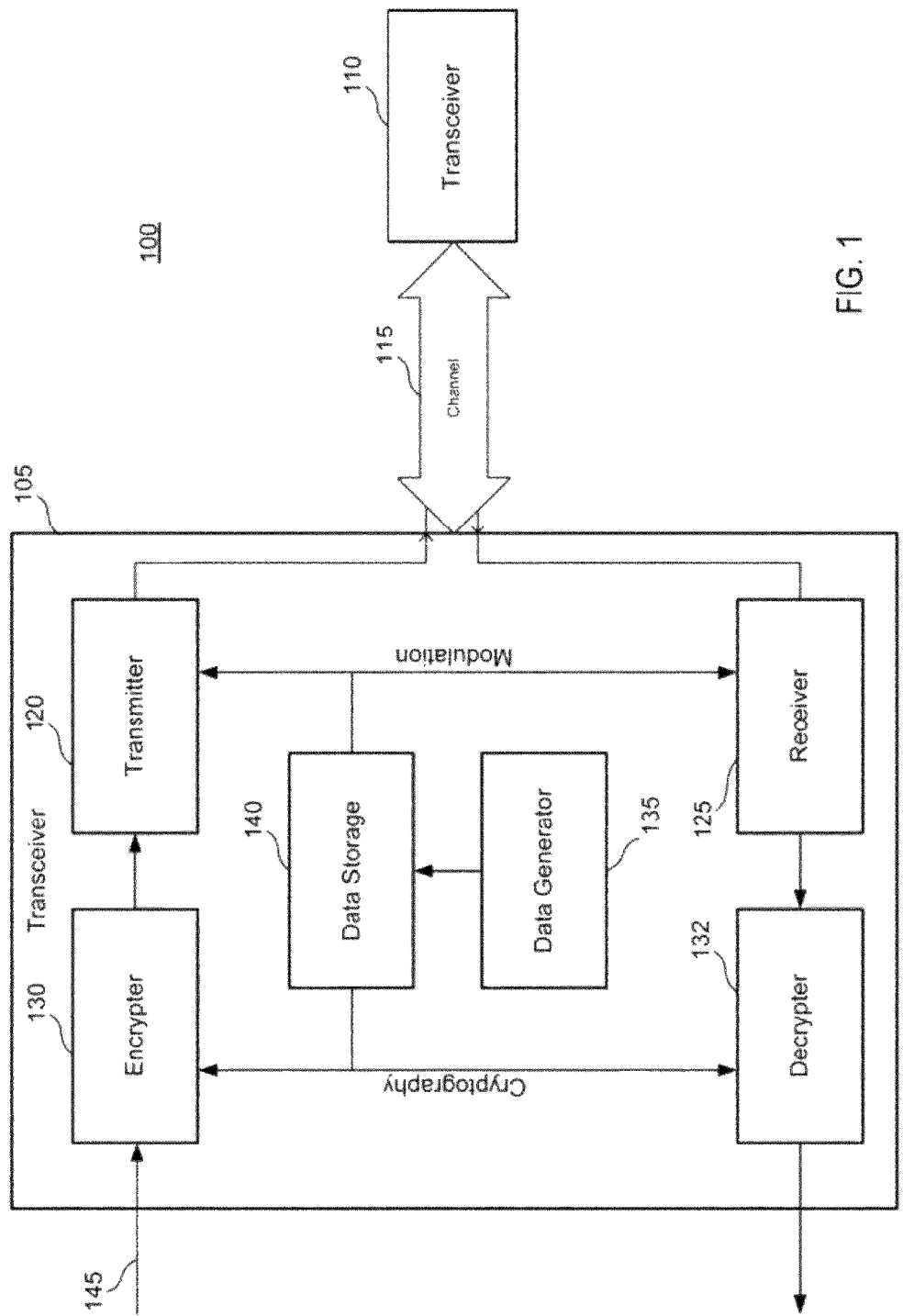
FIG. 1 is a schematic illustration of a communication system according to an embodiment of the present invention.

FIG. 1 is a schematic illustration of a communication system according to an embodiment of the present invention. The communication system 100 includes two transceivers 105 and 110. The transceivers 105 and 110 may each include a transmitter, a receiver, or both. The transceivers 105 and 110 may communicate through a communications channel 115. Some components of the transceiver 105 are also shown in FIG. 1, and similar components may also be found in the transceiver 110. The transceiver 105 includes a transmitter 120 that may transmit information over the communications channel 115 to the transceiver 110. The transceiver 105 also includes a receiver 125 that may receive information over the communications channel 115 from the transceiver 110. The transceiver 105 also includes an encrypter 130 and a decrypter 132, a data generator 135, and data storage 140. Although data generated according to the present invention and stored in the data storage 140 may be used for a variety of purposes, the system 100 is illustrated to demonstrate the use of data in the data storage 140 as one or more cryptographic keys. The encrypter 130 may receive an input signal 145 and encrypt the signal using a key obtained from the data storage 140. Keys in the data storage 140 may have been generated by the data generator 135. Similarly, the decrypter 132 may receive a signal from the receiver 125 and decrypt the signal using a key obtained from the data storage 140. In this manner, the transceivers 105 and 110 may exchange encrypted communications over the communications channel 115. Although not shown, in a similar manner, a system may be provided having a modulator within the transceiver 105 that may modulate communication in accordance with data stored in the data storage 140 and used as a hopping sequence or spreading code. For example, the transmitter 120, receiver 125, or both, may utilize data from the data storage 140 to modulate and demodulate information received from the communications channel 115. Accordingly, data stored in the data storage 140 may be used for cryptography, modulation, or both.

A communications channel, such as the communications channel 115 in FIG. 1, generally refers to the medium between a transmitter and a receiver. Any of a variety of mediums may be included in a communications channel, such as but not limited to free space. Energy is communicated over the communications channel, and any type of energy may generally be used including, but not limited to, electromagnetic, acoustic, thermal, and mass flux. Although only a single communications channel 115 is shown in FIG. 1, there may be multiple communications channels between transceivers, and each transceiver may be in communication with any number of other transceivers over a corresponding number of channels, as is well understood in the art. Information may be conveyed over the communications channel by transmitting from a transmitter a signal that has a metric which varies over a domain. Any of a variety of metrics and domains may be used to transmit a signal. Metrics used may include amplitude and phase while domains may include time, frequency, space, polarization, and code. The code domain refers to transmission and correlation of pseudorandom spreading codes. So, for example, an AM radio signal may be broadcast in free space (medium) and carry information on a carrier that varies in amplitude (metric) over time (domain).

Suitable designs for the transmitter 120, receiver 125, and encrypter 130 and decrypter 132 are known in the art, and any such design may be used for transmitting information into the communications channel 115, receiving information from the communications channel 115, and encrypting or decrypting communications, respectively. It is to be understood that in some embodiments of the present invention only a transmitter or a receiver may be present in some communication units where only transmitting or receiving may be desired. Additionally, some transceivers according to embodiments of the present invention may include more than one transmitter, more than one receiver, or both.

The data storage 140 may be implemented as any type of storage, including any of a variety of memory devices or other electronic storage media. The data storage 140 may be integral to the transceiver 105 or placed in any location accessible to the encrypter 130, decrypter 132, transmitter 120, or receiver 125, or combinations of those components as desired. Additionally, the data storage 140 may be implemented as multiple storage units if desired.

The encrypter 130 and decrypter 132 may be implemented in hardware, software, or combinations thereof, and may include a processor and computer readable instructions encoded on one or more computer readable media that cause the processor to encrypt signals to be sent over the communications channel 115, decrypt signals received over the communications channel 115, or both. The encryption, decryption, or both, proceeds using one or more keys stored in the data storage 140, as will be described further below.

An example of a communications system that may utilize encrypted communication over a communications channel has been described above. Examples of the data generator used to generate data based on characteristics of the communications channel are described below.

Figure 2:
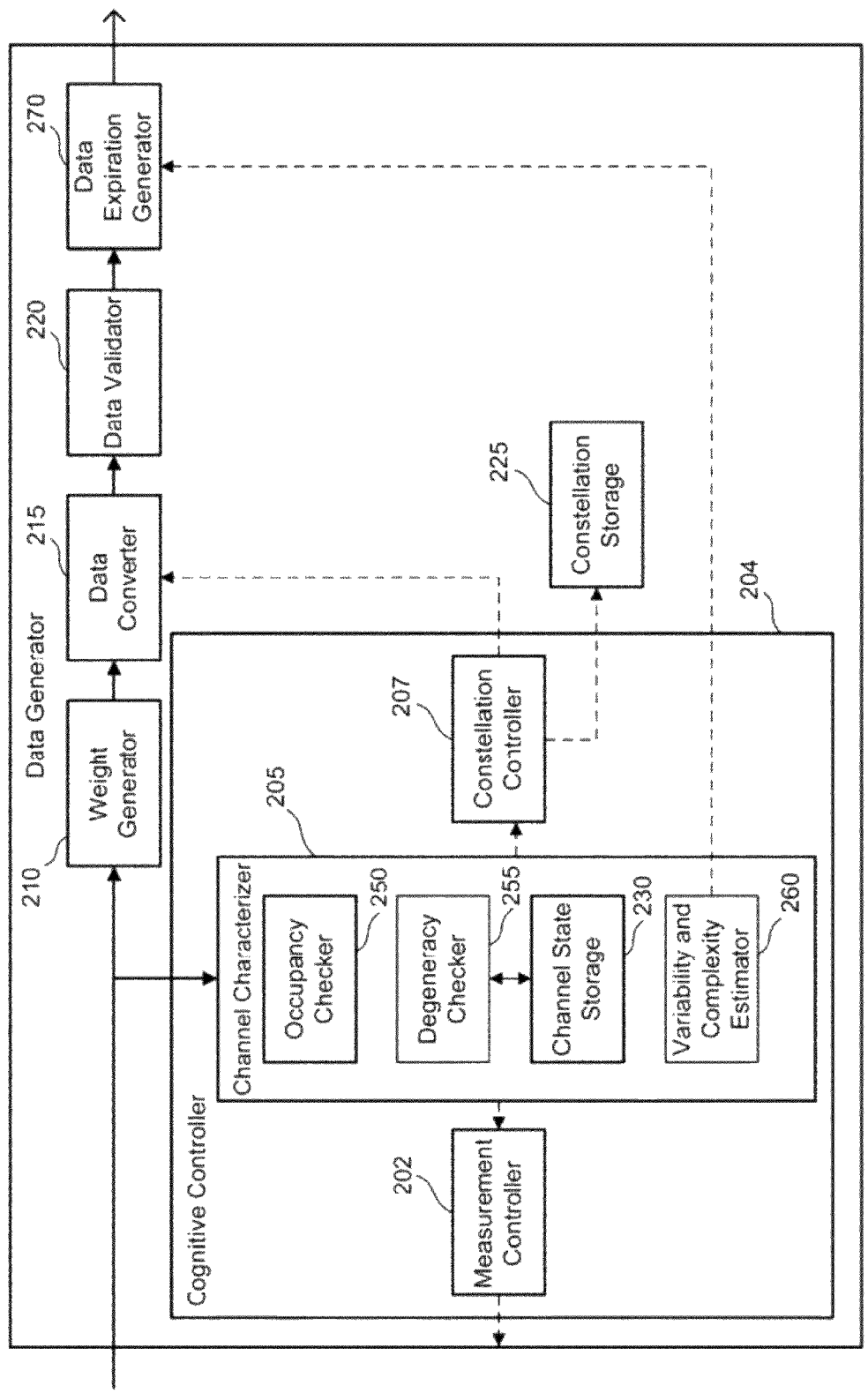
FIG. 2 is a schematic illustration of an example of a key generator according to an embodiment of the present invention.

FIG. 2 is a schematic illustration of an example of the data generator 135 of FIG. 1. Components are shown in FIG. 2 and their implementation and function will be described further below. The data generator 135 may include a cognitive controller 204 that may include a measurement controller 202, a channel characterizer module 205, and a constellation controller 207. The channel characterizer module 205 may include an occupancy checker 250, a degeneracy checker 255, and a complexity estimator 260. The degeneracy checker 255 may store information related to the state of a communications channel in a channel state storage 230, as will be described further below. The data generator 135 may further include a weight generator 210, a data converter 215, a data validator 220, and a data expiration generator 270. The data generator 135 may interact with one or more storage devices including the data storage 140 of FIG. 1, constellation storage 225, and channel state storage 230. The components shown may be implemented utilizing hardware, software, or combinations thereof. For example, one or more processors may execute computer readable instructions for performing the functionalities described below. Although constellation storage 225, channel state storage 230, and data storage 140 are shown separately in FIGS. 1 and 2, the different storage areas may be located on a same or different storage devices.

Figure 3:
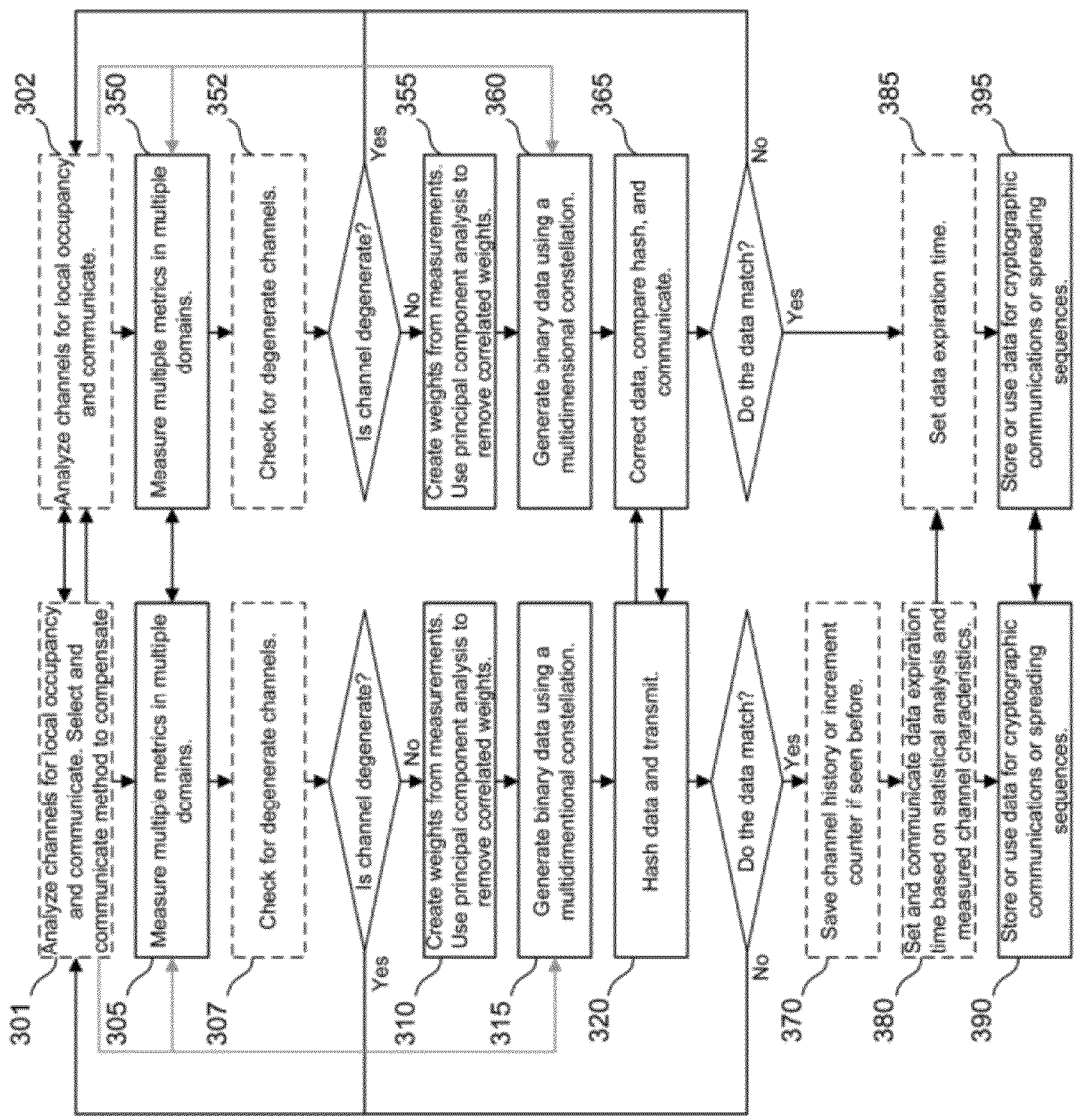
FIG. 3 is a flowchart illustrating an example of a key generation method according to an embodiment of the present invention.

FIG. 3 is a flowchart illustrating an example of a key generation method. Blocks on the left side of FIG. 3 may be performed by the transceiver 105 of FIG. 1 while the blocks on the right side may be performed by the transceiver 110 of FIG. 1, as will be described further below. Generally, FIG. 3 illustrates methods that may be implemented by a receiving apparatus (left-hand side) and a responding apparatus (right-hand side).

The blocks of FIG. 3 will now be described with reference to the components shown in FIGS. 1 and 2. In blocks 301 and 302, the initiating and responding apparatuses, respectively, may analyze communications channels accessible to the apparatuses for occupancy. In this manner, a presence of a jammer or other communication in all or a portion of available communications channels may be identified. This may be performed, in part by the occupancy checker 250 of FIG. 2. In blocks 305 and 350, multiple channel characteristics may be measured. The channel characterizer module 205 and measurement controller 202 of FIG. 2 may measure multiple channel characteristics of the communications channel 115. The channel characterizer module 205 may characterize one or more features of the communications channel including the variability, complexity, periodicity, degeneracy, and occupancy of the communications channel. A state of the channel, based on the measured features, may be stored in the channel state storage 230, as will be described further below. In blocks 307 and 352, a check for degenerate channels is performed. The degeneracy checker 255 of FIG. 2 may perform this check. As will be described further below, if, a communications channel is insufficiently complex, variable, or aperiodic, the channel may be considered degenerate, and not used for data generation. If the channel is considered degenerate, the channel may not be used, and the process may begin again at blocks 301 and 302, as shown in FIG. 3. If the channel is not considered degenerate, in blocks 310 and 355, weights are created from channel measurements. The weights refer to a representation of some of the measured channel characteristics in at least two dimensions. As will be described further below, the weights may be normalized or otherwise generated in a manner designed to increase the robustness of the data generated. The weight generator 210 of FIG. 2 may generate the weights based on signals received from the channel measurement characterizer 205 and measurement controller 202. Referring back to FIG. 3, data is generated in blocks 315 and 360 using a multi-dimensional constellation. The multi-dimensional constellation, as will be described further below, is a representation of a map between bits of data and weights that may be generated in the blocks 310 and 355. The data converter 215 in FIG. 2 may generate the data by accessing one or more constellations stored in the constellation storage 225, and may store the generated data in the data storage 140. Referring back to FIG. 3, in block 320, the generated data may be hashed and transmitted to the responding apparatus. In block 365, the data generated by the responding apparatus may also be hashed, received hashed data from the initiating apparatus may be corrected if necessary and compared to the hashed data generated by the responding apparatus. Agreement or disagreement may be communicated between the two apparatuses. Correcting, hashing, and comparing data are conventional operations and may be performed in any suitable manner. Generally, if the data generated by the initiating and responding apparatuses match, then the data may continue to be stored in the data storage 140 for use as cryptographic keys or sequences or codes for modulating communications. If the keys do not match, the key may be discarded and not used to encrypt, decrypt, or modulate communications. Data may then be stored, used, or both for cryptographic communications or spreading sequences in blocks 390 and 395.

Systems and methods according to the present invention may also save information about a channel, and may set an expiration time associated with generated data. Referring again to FIG. 3, channel history may be saved in block 370. The channel state may be stored in the channel state storage 230 of FIG. 2. Information about the variability of the channel may be included in the channel state, and it may be generally the same type of information used to determine whether a channel is degenerate. A counter may be used to count occurrence of a particular channel state, in order in some examples to avoid the use of periodic channel states, as will be described further below. Based on the channel state, a data expiration time may be set in blocks 380 and 385.

Having described an overview of an example system, blocks shown in FIG. 3 will now be further described. To begin, the analysis of channels for local occupancy in blocks 301 and 302 will be further described. Each apparatus may analyze communications channels available to it for the presence of jammers or other communications occurring in the channels. Any used channels or portions of channels may accordingly not be used to generate data. So, for example, in the case of a narrowband jammer in one or more communications channel, the transceivers 110 and 105 may become aware of the presence of the jammer in a portion of the channels, and filter those portions, or discard those portions in the use of data generation to be described further below. Similarly, a noise floor associated with each apparatus may be identified and communicated to the other apparatus. This may also be performed by the occupancy checker 250 if FIG. 2. In this manner, the initiating and responding apparatuses may compensate for a more broadband jammer. The broadband jammer may be viewed as raising the noise floor, and the noise floor may be raised in a different manner for the two transceivers 110 and 105 of FIG. 1 based on the positioning of the jammer. By communicating the dynamic range available to each transceiver 105 and 110 in the blocks 301 and 302 of FIG. 3, the transceivers may compensate for their different dynamic ranges. For example, if the transceiver 110 reports a signal-to-noise ratio of 10 dB while the transceiver 105 reports a signal-to-noise ratio of 20 dB, the transceiver 110 may clip a bottom 10 dB of received signal to operate at a same dynamic range as the transceiver 105. The filtering and clipping operations may be performed by suitable units not necessarily shown in FIG. 2.

The channel characteristics may be measured in block 305 of FIG. 3 by the channel measurement module 205 of FIG. 2. Multiple metrics may be measured in one or more domains. Generally, wireless signals exchanged by a pair of transceivers over a reciprocal channel may experience identical multipath fading. The fading may be viewed as a modulation of a carrier and itself conveys information about the physical state of the channel. On reception, the information may be extracted by measuring metrics over domains. An absolute measurement, a differential measurement, or combinations of absolute and differential measurements may be used. For example, in a given channel, such as the communications channel 115 of FIG. 1, the variation of carrier magnitude (metric) over time (domain) may be measured. Relative carrier phase (metric) between several antennas over space (domain) may also be measured. That is, a carrier signal received over a communications channel may be demodulated by the receiving transceiver and resulting information may be used to generate data for use as a cryptographic key or in a modulation technique. Any metrics and domains may be used. In some examples, the time domain may not be used, and data may be generated using measurements from a single time step. The available amount of information that may be extracted from a communications channel is a function of the complexity of the channel and the number of uncorrelated channels a measurement module may access. Data generated according to some examples described herein may be less robust for use in correlated channels, since channel information is used to generate the data and a transceiver in a correlated channel may be able to also generate the data, compromising the security of the communication. In some examples, a transceiver may monitor a state of multiple communications channels and select uncorrelated varying channels for use in generating data for use in modulation or as keys. The variability may be quantified for carrier amplitude fading in time, frequency, or space by measuring the coherence time, coherence bandwidth, coherence length, or similar measure.

Any of a variety of methods may be used to measure the channel characteristics described above. In some examples, any method may be used that results in the generation of a representation of the impulse response of the channel. The impulse response of the channel may be generated in one domain (such as time), and a transform, such as a Fourier transform, used to generate a representation of the impulse response of the channel in another domain (such as frequency). In one example, the transmission of a pseudorandom number (PRN) is used to estimate the impulse response of a channel. Referring back to FIG. 1, the transceiver 110 may transmit a pseudorandom number over the communications channel 115. In one example, the pseudorandom number includes a 100 Mb/s, 1024 bit PRN sequence that may be transmitted thirty times at a carrier frequency of 60 GHz. In other examples, other data rates, sequence lengths, number of repetitions, and frequencies may be used. There may be a tradeoff between the gain provided by longer codes and attenuation from frequency and phase instabilities of the receivers and transmitters used. The pseudorandom number, modulated by the communications channel 115 may then be received at the receiver 125. By correlating the received signal, an estimate of the channel impulse response may be generated. The correlation and estimation may be performed by the receiver 125, by the channel measurement module 205 of FIG. 2, or combinations of those components, or in some examples using another suitable processing unit.

Examples of methods for measuring channel characteristics have been described above. Generally, the channel characteristics are measured as metrics over domains (such as amplitude over frequency, amplitude over time, or any other combination of the metrics and domains described above). Referring back to block 310 of FIG. 3, weights may then be generated based on the measurements. The weights may be generated by applying linearization or normalization operations on the measurements. Accordingly, weights may be normalized measured channel characteristics, linearized measured channel characteristics, or combinations thereof. In this manner, the weights may provide a standardized representation of the communications channel and facilitate comparison against a constellation. In particular, in some examples, a linearizing or normalizing function is used that ensures or improves the ability of a constellation to return any symbol with equal probability. Constellations will now be further described below, but generally map the measured channel characteristics to bits used to generate the data to be used as a cryptographic key or in a modulation technique. To improve the reliability of the data, the constellation should be designed and the weights generated such that when the constellation is addressed using the weights, there is an approximately equal probability of returning each symbol. Variations on the probability of each symbol may occur in practice, however, the key may be more robust as the variations are minimized.

Figure 4:
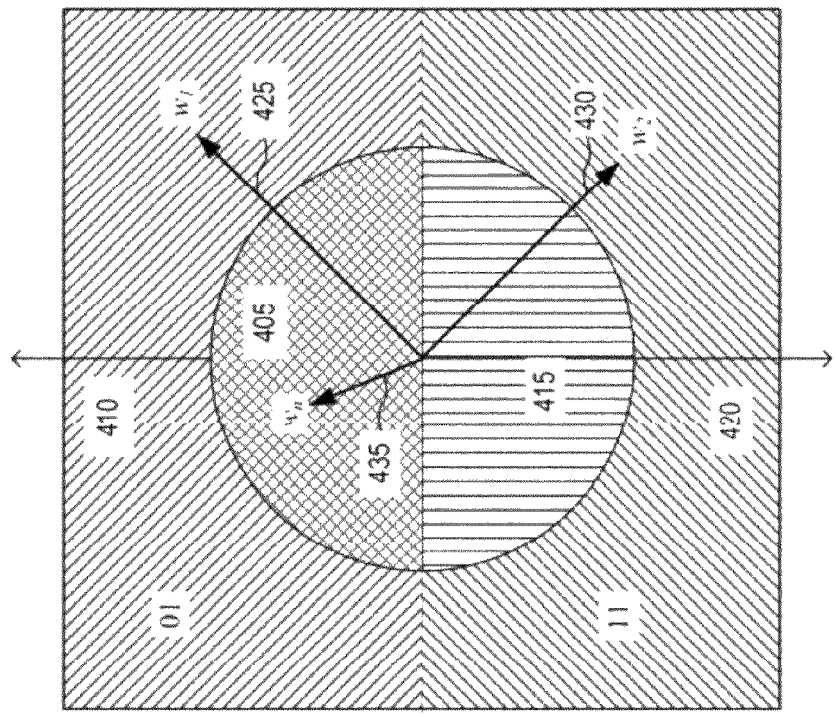
FIG. 4 is a schematic illustration of an example of a two-dimensional constellation according to an embodiment of the present invention.

Examples of the present invention utilize constellations to generate a series of bits based on the measured channel characteristics. The constellations may have one or more dimensions, and in some examples two or more dimensions. The constellations include a representation of which regions of vector space are associated with each of a plurality of possible symbols, which may be one or more bits in length. The symbols may be combined to form a complete key. An example of a two-dimensional constellation 400 is shown in FIG. 4. The constellation defines four regions 405, 410, 415, and 420. The region 405 maps to a bit sequence '00'. The region 410 maps to a bit sequence '01'. The region 415 maps to a bit sequence '10'. The region 420 maps to a bit sequence '11'. The constellation is addressed using a vector that may represent one or more weights, described above. As described above, any metrics may be used to generate the weights. For example, three vectors 425, 430, and 435 are shown in FIG. 4. The length of the vectors 425, 430, and 435 may correspond to a weight based on an amplitude measurement in a particular domain, while the direction of the vectors may correspond to a weight based on a phase measurement in that particular domain, or a different domain. The weight 425 is in the region 410, and therefore will convert to a bit sequence '01'. The weight 430 is in the region 420 and therefore will convert to a bit sequence '11'. The weight 435 is in the region 405 and therefore will convert to a bit sequence '00'. In this manner, using the weights 425, 430, and 435, a bit sequence of '011100' would be generated. Constellations may be stored in the constellation storage 225 in FIG. 2 and may be stored as any type of representation, such as a look up table or other map, between the constellation space and the bit sequences. The constellations may be generated completely or in part by the constellation controller 207. In some examples, the constellation controller 207 may not be part of the data generator 135 or the transceiver 105 of FIG. 1.

Recall data generated by multiple transceivers in a system may be compared to validate the key for use. Differences in weight values generated by the transceivers based on a same channel measurement, however, may exist due to non-idealities in the system including, for example, domain synchronization errors such as time, clock drift in phase, or oscillator drift in frequency. Accordingly, an error bound may be associated with a weight, and with a vector used to address a constellation, in some examples of the present invention. An example of weight error bounds is shown schematically in FIG. 5. The vector 505 is associated with an error bound 510. The vector 515 is associated with an error bound 520. The vector 525 is associated with an error bound 530. The size and shape of the error bounds may be a function of how rapidly the measured metric varies in the measured domain. To reduce errors, a system may change a sampling rate of the channel or reduce the complexity of the constellation to compensate for error bounds. That is, for example, if one or more of the error bounds 510, 520, or 530 is found to overlap a boundary between symbols of the constellation, the constellation may be changed to redefine the symbol boundaries, a different sampling rate may be used for channel measurements, or a combination of those techniques may be implemented. Although the error bounds may be estimated and the constellations updated using any appropriate processing unit, in one example referring back to FIG. 2, error bounds may be generated by the channel characterizer module 205 which may also alter one or more constellations in the constellation storage 225 based on the error bounds. The constellation controller 207 may be used to alter the constellation.

Figure 5:
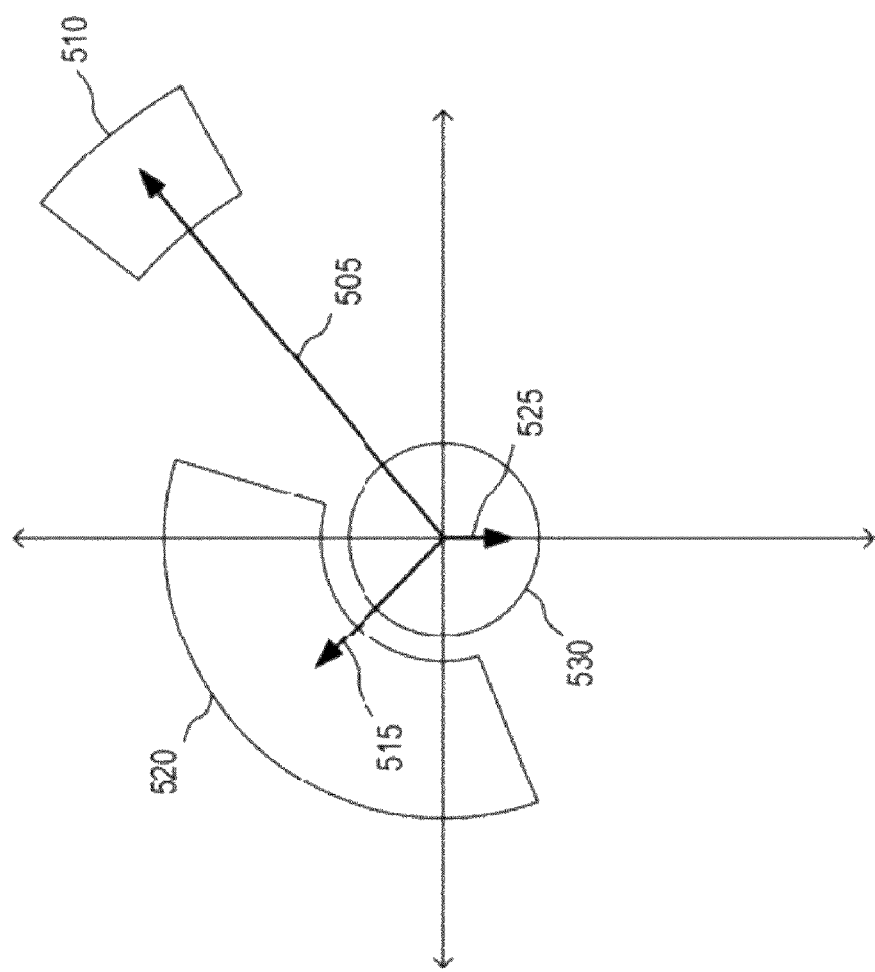
FIG. 5 is a schematic illustration of an example of weight error bounds according to an embodiment of the present invention.
Figure 6:
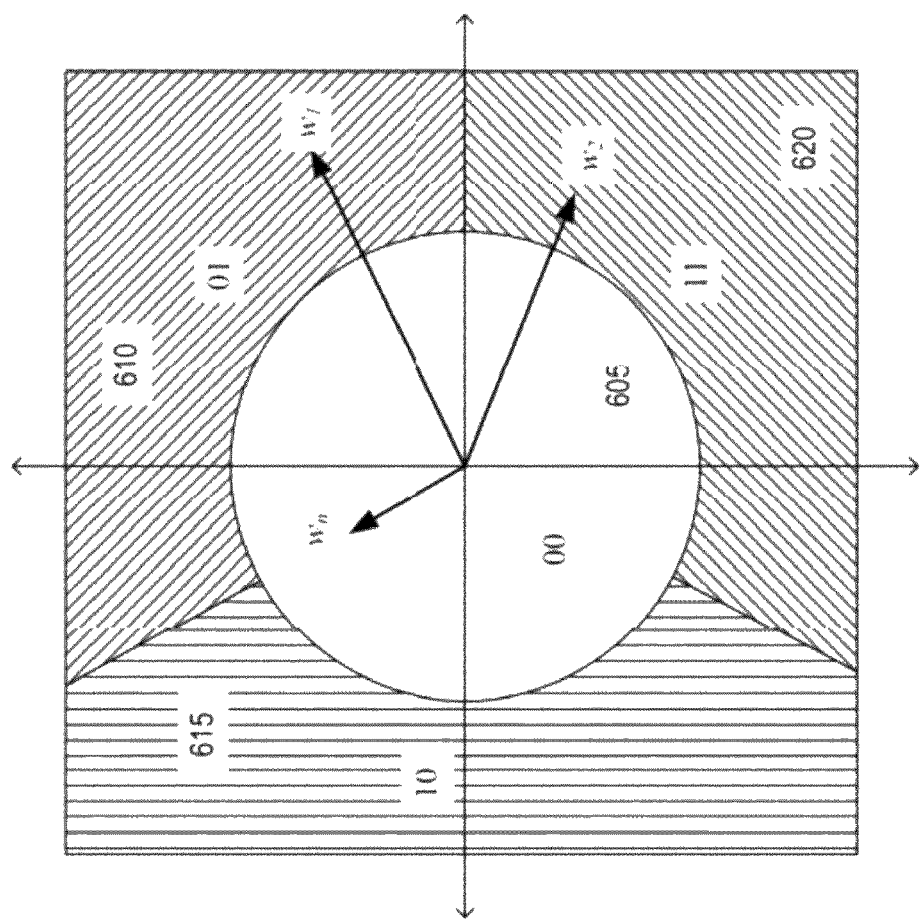
FIG. 6 is a schematic illustration of an example of a constellation according to an embodiment of the present invention.

One example of changing a constellation based on error bounds will now be described. Error bounds may be found to have a dependence between dimensions of a particular metric. For example, in a two-dimensional constellation using magnitude and phase as metrics, phase may change slowly at amplitude peaks and rapidly at amplitude nulls in a time-varying channel. Accordingly, error bounds in phase may be a function of magnitude, as can be seen in FIG. 5 where the error bound 520 associated with a smaller magnitude vector 515 is larger than the error bound 510 associated with the larger magnitude vector 505. Accordingly, a constellation 600 of FIG. 6 may be defined that may exclude phase information at low amplitudes and include phase information for larger amplitudes. The constellation 600 includes a region 605 associated with the symbol '00', a region 610 associated with the symbol '01', a region 615 associated with the symbol '10' and a region 620 associated with the symbol '11'. Note that for vector amplitudes less than the circle defining the region 605, the phase of the vector will not have an effect on the symbol selected. In this manner, the larger error bounds associated with smaller amplitude vectors may have less of an effect on the reliability of the generated cryptographic key. For larger amplitude vectors, however, the phase of the vector may effect which of the regions 610, 615, or 620 selects the symbol.

Selection between useful domains, weights, vectors, and constellations may be done heuristically or through other methods such as principal component analysis (PCA). PCA utilizes a mathematical procedure that may transform a number of possibly correlated variables into a smaller number of uncorrelated variables called principal components. In this manner, more information may be extracted from a communications channel by reducing the number of variables to those that provide uncorrelated information.

Examples of data generation using a multi-dimensional constellation have accordingly been described above. The generated data may be stored in the data storage 140 of FIG. 1. Generally, data may be generated by both the transceivers 105 and 110 of FIG. 1 using measurements each respective transceiver makes of the communications channel 115. Referring back to FIG. 3, following generation, the data may be corrected, hashed, and compared in blocks 320 and 365 to ensure valid data was generated. Data correction, hashing, and comparison techniques are known in the art. Algebraic decoding methods may be used, as can more complex methods such as fuzzy information reconciliators. In algebraic decoding, data may be padded with known data and a syndrome generated and exchanged between transceivers. The exchange of syndromes may allow for correction of several erroneous bits. Following correction, validation of the data may be performed by comparing a one-way hash of the data. Data correction, hashing, and comparing may be performed by the data validator 220 of FIG. 2. Data that cannot be validated may not be stored in the data storage 140 of FIG. 1 in some examples or may be marked as unreliable.

As has been described above, information about a communications channel may be used in examples of the invention to generate data that may be used as one or more cryptographic keys or in a modulation technique. The strength of the data generated may be affected by the complexity and variability of the communication channel used to generate them. Information about features of the communications channel may be used to determine if a channel is degenerate in blocks 307 and 352 of FIG. 3 and channel state information may be stored, for example, in the channel state storage 230 shown in FIG. 2. The stored channel state or measured channel features (such as complexity) may be used for any of a variety of purposes. The channel state may be stored to develop a history of the channel, in the block 370 of FIG. 3. The state information may be used to estimate a strength of the data, expiration times for the data, or both, such as in the blocks 380 and 385 of FIG. 3. The state or characterized features of the channel may also be used to alter a sampling rate of the communications channel. The measurement controller 202 of FIG. 2 may accordingly sample more complex channels faster, and less complex channels slower, for example. In this manner, a channel may be optimally sampled such that the measurement represents the channel state without loss (undersampling) or redundancy (oversampling). This may be advantageous because interleaving data used to generate a cryptographic key or code for a modulation scheme may compromise the integrity of the data should the interleaving procedure become known. The state or characterized features of the channel may also be used to select, generate, or adjust the constellations described generally above.

Channel state may include a measure of metric variations over each domain. For example, the channel state may include a domain coherence, such as coherence time or coherence bandwidth for amplitude fading. The coherence may be used to estimate a data strength and set an expiration time for the data. The data expiration generator 270 of FIG. 2 may generate the expiration time. Although the particular relationship between the channel state and the data expiration time will depend on the particular system implementation, generally an expiration time may be set that is at most the time required to do a brute-force data search and at least the time required to solve for the channel information. A data expiration time may be stored and associated with the data, for example in the data storage 140 of FIG. 1. Data retrieved from the data storage 140 may then be used for an amount of time less than or equal to the expiration time, after which different data may be selected for use.

Some communications channels may exhibit periodicity. For example, some communications channel environments may revert to a common state periodically, such as a downtown street on a Sunday morning. If the communications channel has a low variability when in these periodic states, data generated during that period may be vulnerable since an adversary may develop an understanding of the communications channel at the periodic state. Accordingly, a history of channel states may be stored at block 370 of FIG. 2. The channel state history may be stored in the channel state storage 230 of FIG. 2. A counter may be used along with the channel state to identify a frequency of state occurrence, and should a particular state occur with greater than a threshold frequency, that state may be indicated as a periodic state and not used to generate cryptographic keys. Similarly, the system may identify degenerate channel states at the blocks 307 and 352 of FIG. 3 based on the information stored in the channel state storage, and data may not be generated based on degenerate channel states. Degenerate channel states generally refer to simple channels having insufficient complexity to generate robust data for use as a cryptographic key or in a modulation scheme. In some examples, degenerate channel states may be ameliorated through, for example, independent reciprocal pseudorandom variation of the communications channel by individual transceivers. That is, transceivers may introduce pseudorandom reciprocal variations in a carrier of a transmitted signal over any domain. It may be advantageous to have the variations be independent since reordering of data using a shared function, such as interleaving, may compromise the integrity of the data since the interleaving operation may become known.

Secret data and data generation methods described herein may be used in communication systems, and may the communication systems may advantageously employ secure communications but may not require a key or other secret data management system. Examples of systems that may utilize embodiments of the present invention include mobile radios for personal, commercial, and military use; wireless ad-hoc networks, and short range communications such as headset to phone. Data generated herein may be used for cryptography as a shared key or for other purposes, such as a seed for a pseudorandom number used for a frequency hopping sequence (FHSS) or direct sequence spread-spectrum (DSSS) modulation.

Once data has been generated as described herein and a secure communications channel is established using the data, it may be possible to generate and share random numbers digitally for use as future cryptographic keys, tokens for future authentication, or modulation (FHSS or DSSS).

Figure 7:
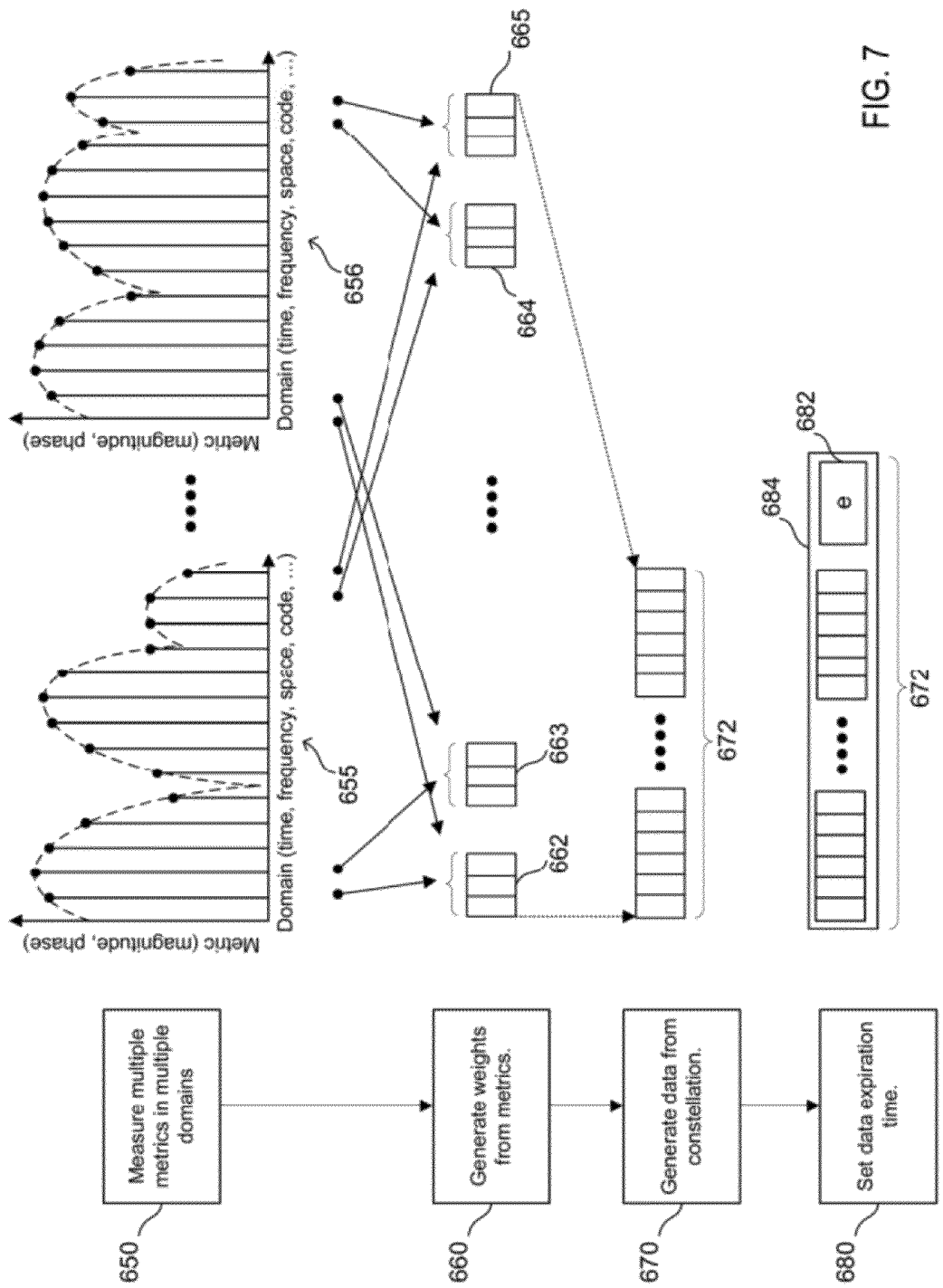
FIG. 7 is a schematic illustration of an example of generating a data structure according to an embodiment of the present invention.

An overview of a method for generating data and setting a data expiration time according to an embodiment of the present invention is shown in FIG. 7. In block 650, channel measurements of multiple metrics in multiple domains may be measured. Multiple media may also be used. Schematic graph 655 illustrates measured samples of a first metric in a first domain. Schematic graph 656 illustrates measured samples of another metric in another domain. The same metric may be used in two different domains, or two different metrics in a same domain may be used, or both the metrics and domains may be different between the graphs 655 and 656. Although only two graphs are shown in FIG. 7, it is to be understood that any number may be used.

In block 660, weights are generated based on the metrics as has been described above. The data structure 662 represents a weight made utilizing a measurement from the graph 655 and from the graph 656. Other weights are generated utilizing other combinations of measurements, including the weights 663-665. In block 670, data is generated using a multi-dimensional constellation, as has been described above. The data structure 672 represents the data generated by addressing the multi-dimensional constellation with the weights 662-665. In some examples, such as when the presence of a jammer had been detected in all or a portion of a communications channel, one or more bits may be discarded that correspond to the occupied portion of the channel. Alternatively, one or more weights may not be used that correspond to the occupied portion of the channel. In other examples, weights may not be generated or measurements not taken corresponding to the occupied portion. In block 680, a data expiration time may be calculated, as has been described above. The expiration time 682 may be stored in a data structure 684 along with the data 672. The entire data structure 684 may be stored in the data storage 140 of FIG. 1.

EXAMPLE 1

The below example of a modeled physical system is provided to facilitate understanding, and is not intended to limit the embodiments of the invention to the particular system described.

Figure 8:
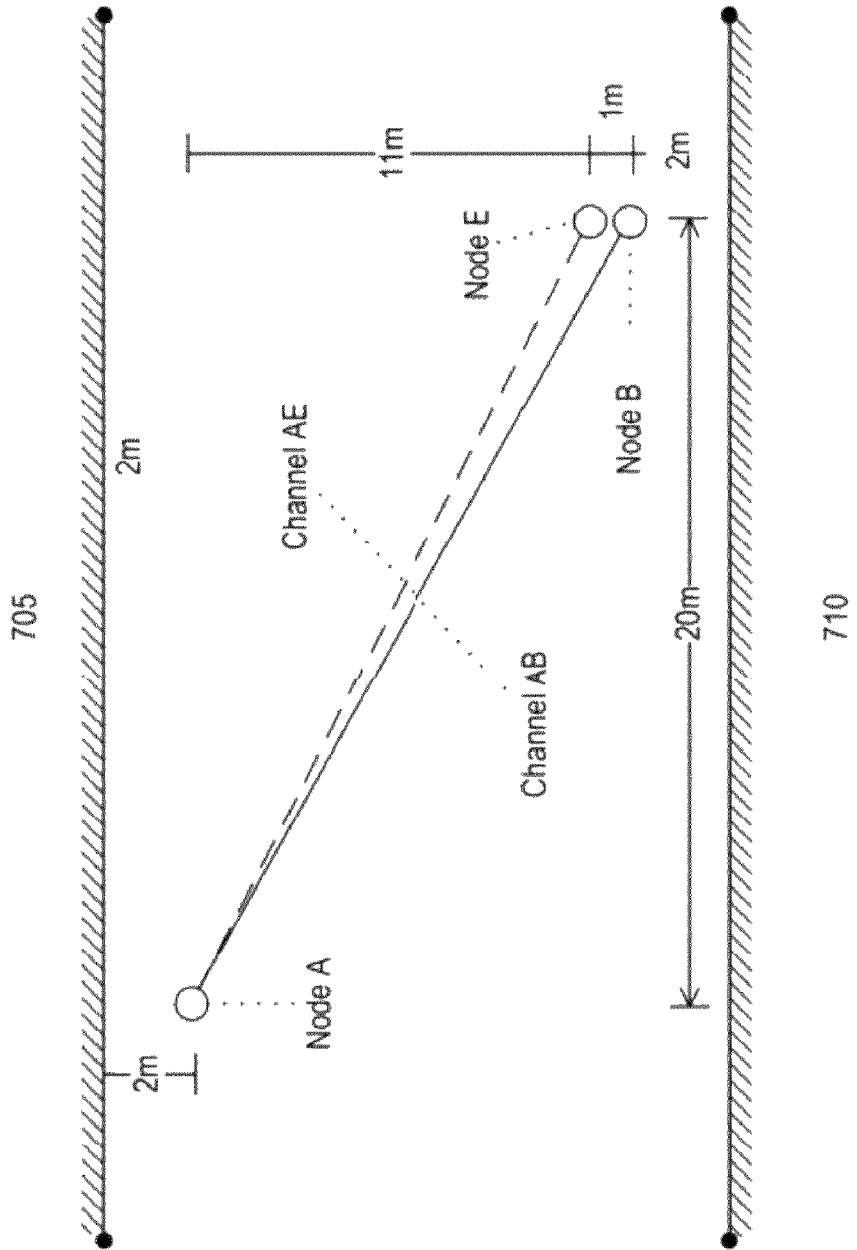
FIG. 8 is a schematic illustration of a topology of a system according to an embodiment of the present invention.

A physical system was modeled in Matlab using a two-dimensional ray-tracing code with the topology shown in FIG. 8. This simulated system represents communication across and down a street between two buildings 705 and 710. Although only the principal ray is shown, the model includes reflections between the reflectors, up to the convergence point of rays with ten reflections. Three nodes are distributed in the space with node B and E placed in close proximity.

The channel was simulated between 2.4 and 2.6 GHz with a 200 MHz or 8% working bandwidth. The separation between nodes B and E was 1 m, which at the center frequency of 2.5 GHz was approximately 8.3λ. At this separation, the antennas were at a distance considered spatially uncorrelated.

Figure 9:
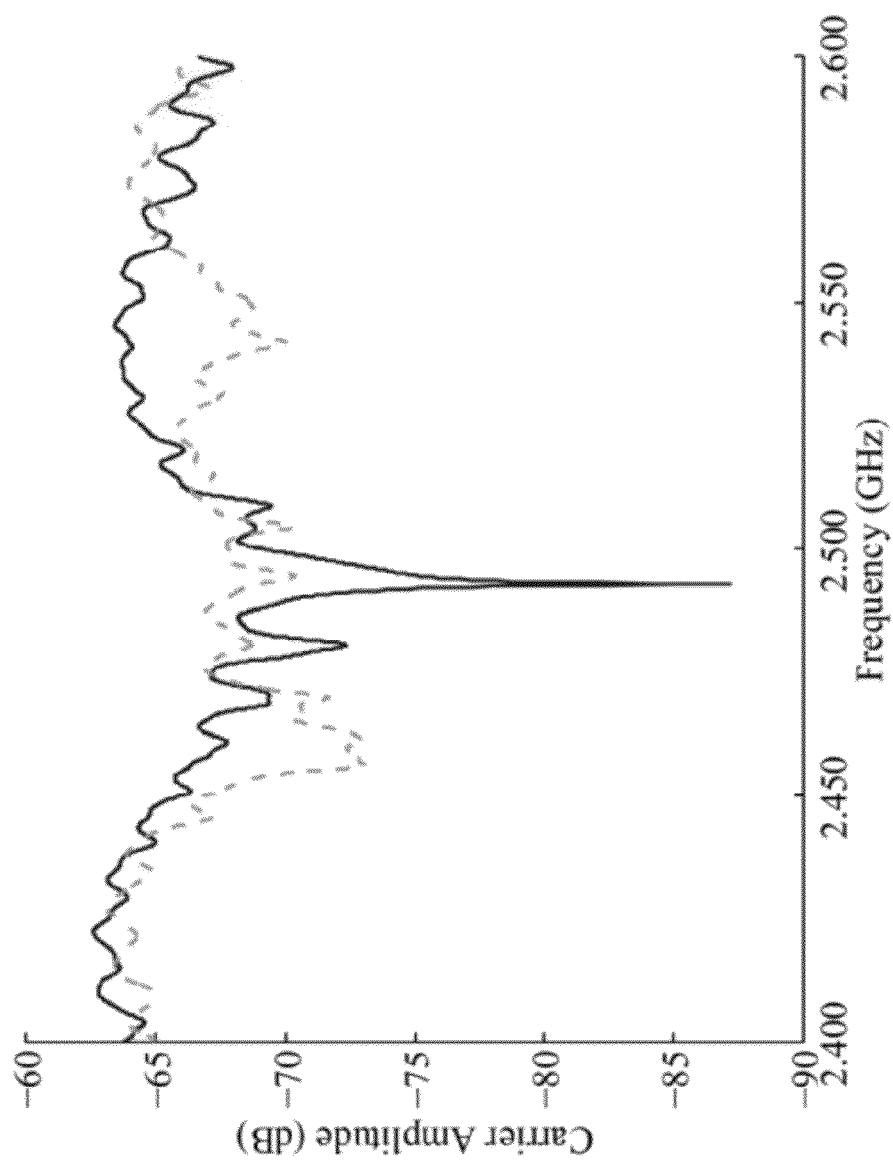
FIG. 9 is a simulated graph of carrier amplitude as a function of frequency according to an embodiment of the present invention.
Figure 10:
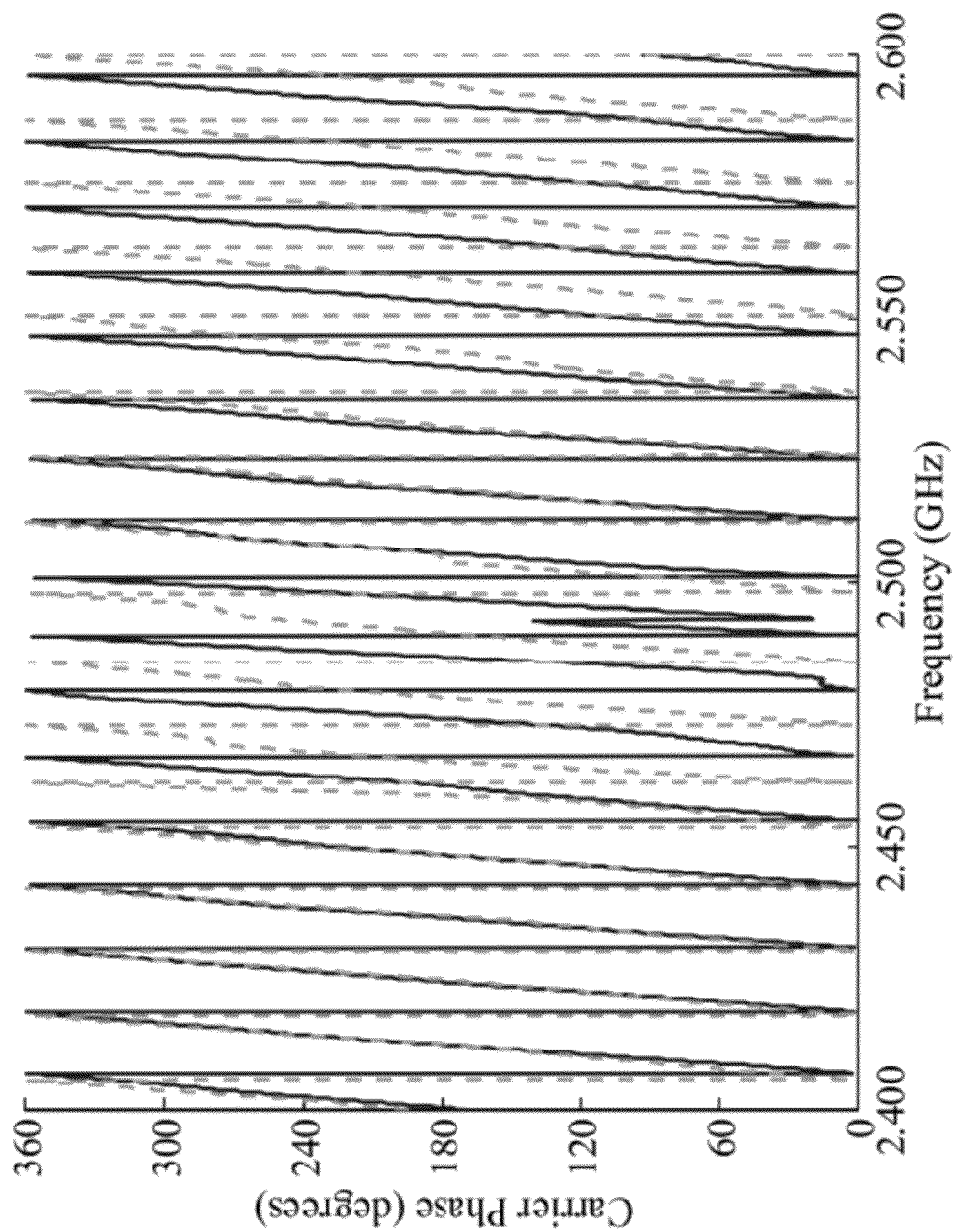
FIG. 10 is a simulated graph of carrier phase as a function of frequency according to an embodiment of the present invention.
Figure 11:
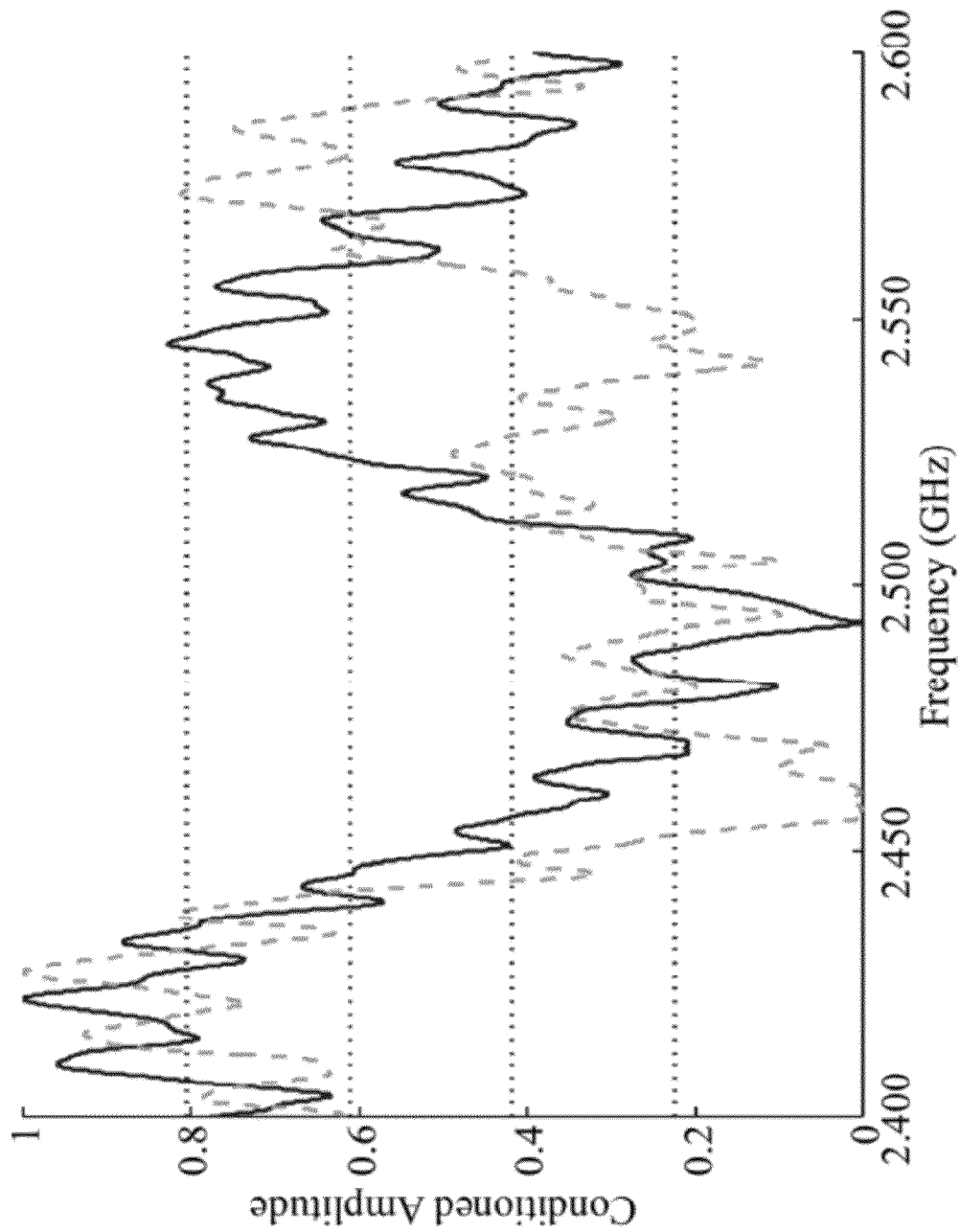
FIG. 11 is a simulated graph of a conditioned metric carrier amplitude as a function of frequency according to an embodiment of the present invention.
Figure 12:
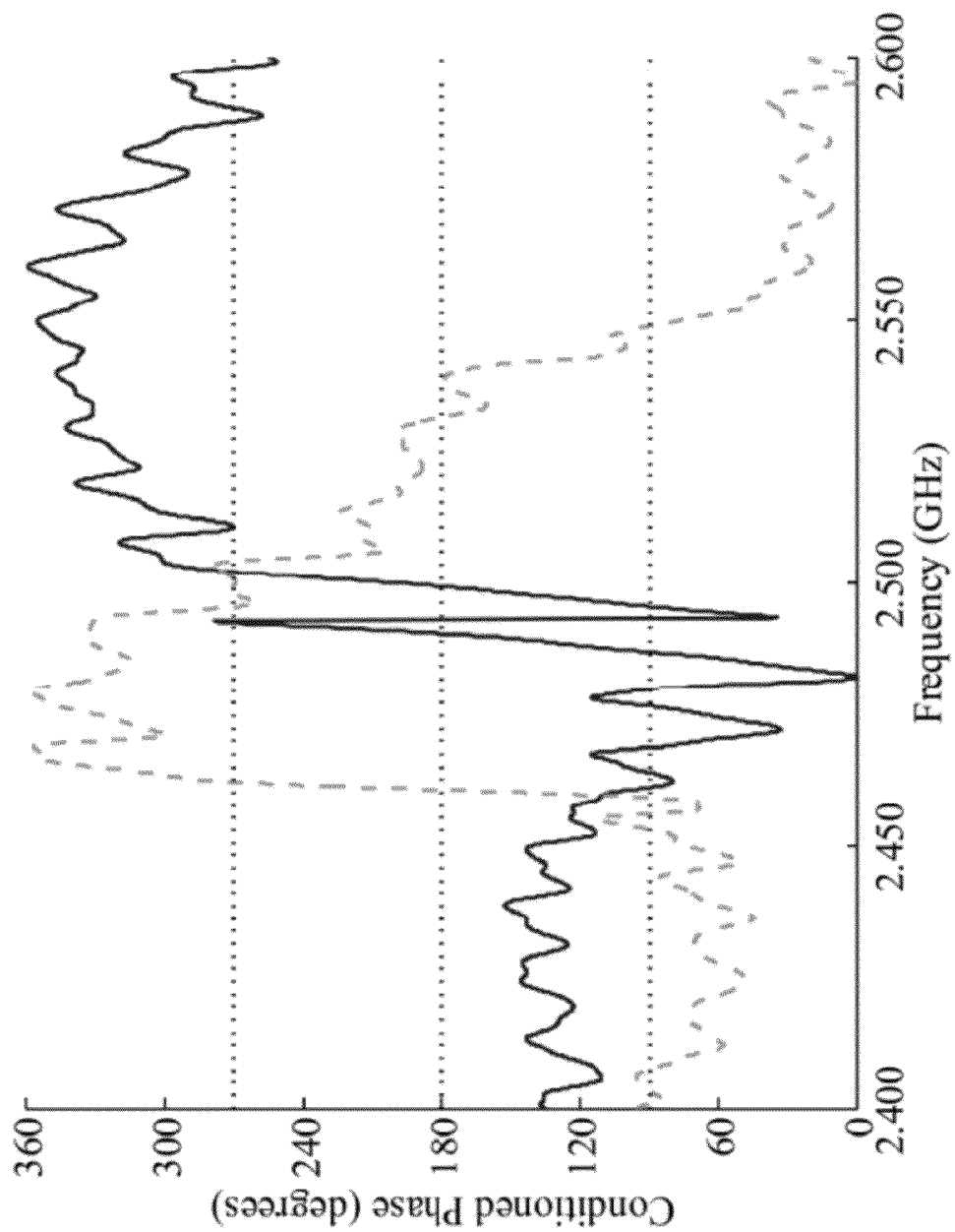
FIG. 12 is a simulated graph of a conditioned metric carrier phase as a function of frequency according to an embodiment of the present invention.

By means of the channel impulse response, the coherence bandwidth of both channels was calculated to be 320 kHz. The frequency step size was dynamically set to approximately eight times this value or 2.5 MHz, yielding a total of 80 frequency points over the bandwidth at which metrics were measured. The magnitude and phase of the received carrier was measured at the sample points shown in FIGS. 9 and 10. FIG. 9 shows carrier amplitude as a function of frequency. FIG. 10 shows carrier phase as a function of frequency. To be suitable as weights which are combined to form vectors to access symbols in the constellation, the metrics were conditioned. The magnitude of the received signal was normalized and scaled. The phase was unrolled, removing the phase change due to the frequency sweep and was similarly scaled. The conditioned metrics are shown in FIGS. 11 and 12. FIG. 11 shows carrier amplitude as a function of frequency, and FIG. 12 shows phase as a function of frequency. The amplitude was normalized and the phase linearized. The first amplitude threshold was related to the median amplitude minus the standard deviation. The following amplitude and all phase thresholds were equal division.

Figure 13:
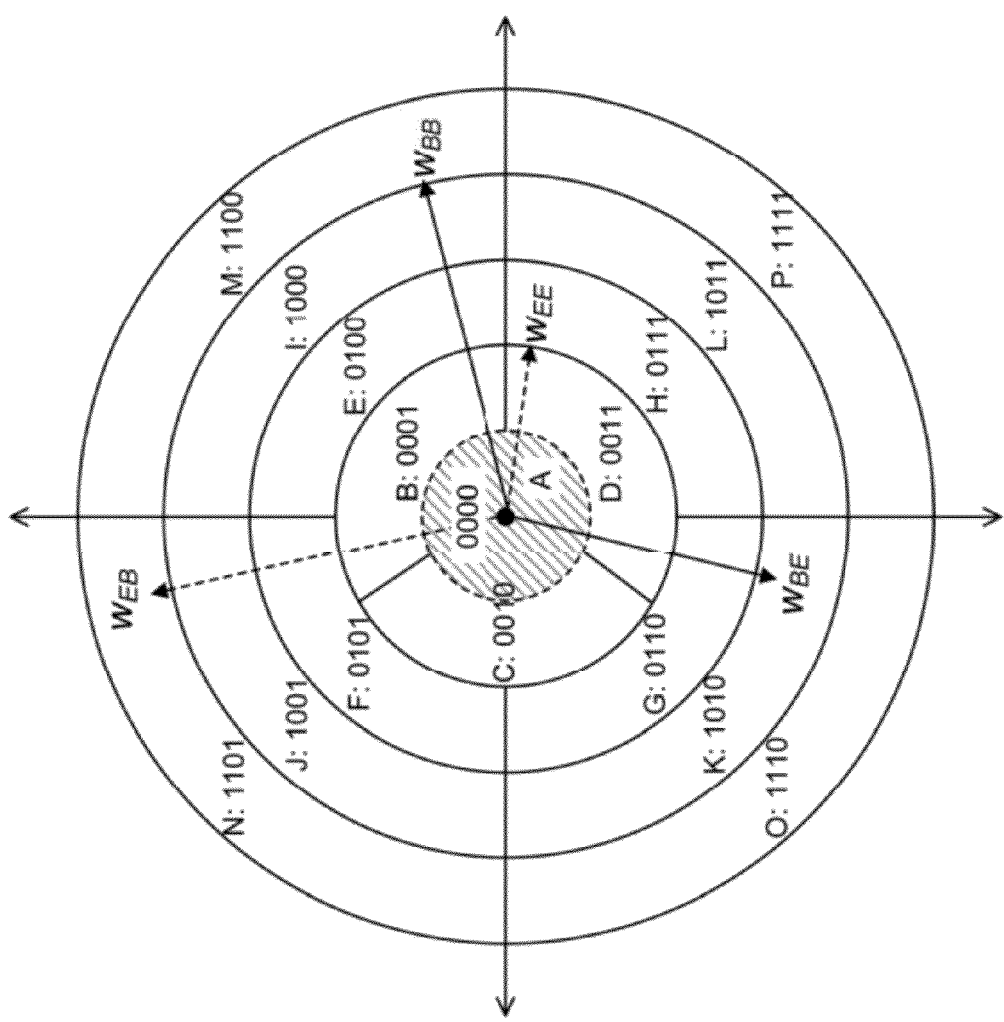
FIG. 13 is a schematic illustration of a constellation according to an embodiment of the present invention.

The constellation is shown in FIG. 13. The lowest magnitude threshold is dynamic and was set by the median of the conditioned amplitude minus the standard deviation as an approximate boundary between a signal and a null. The remaining amplitude region was divided equally. All amplitude regions had four phase regions with the exception of the first and second which have one and three regions respectively. There were a total of sixteen regions each corresponding to a four-bit symbol.

As stated in previously, the variation of the magnitude and phase over frequency are often correlated, with a null in magnitude corresponding to rapid change in phase. Likewise, amplitude peaks tend to correspond to slow phase variation. Thus, to improve variability over the constellation, the magnitude from channel AB was combined with the phase from channel AE to create the vector $w_{BE}$ and conversely the vector $w_{EB}$. These two vectors were utilized simultaneously to generate the private encryption key. However, the vectors $w_{BB}$ and $w_{EE}$, which were based on the magnitude and phase of channel AB and AE, were still utilized to detect regions of rapid change. In use, the symbols returned by the vectors $w_{BE}$ and $w_{EB}$ were used, unless the vectors $w_{BB}$ and $w_{EE}$ returned symbol A.

Over eighty points, each constellation provided 320 b for a total 640 b provided in a single time step. Simulations showed that a 2.5 MHz time-step error between node A and E generated approximately three bit errors, which can be corrected using previously discussed methods.

Figure 14:
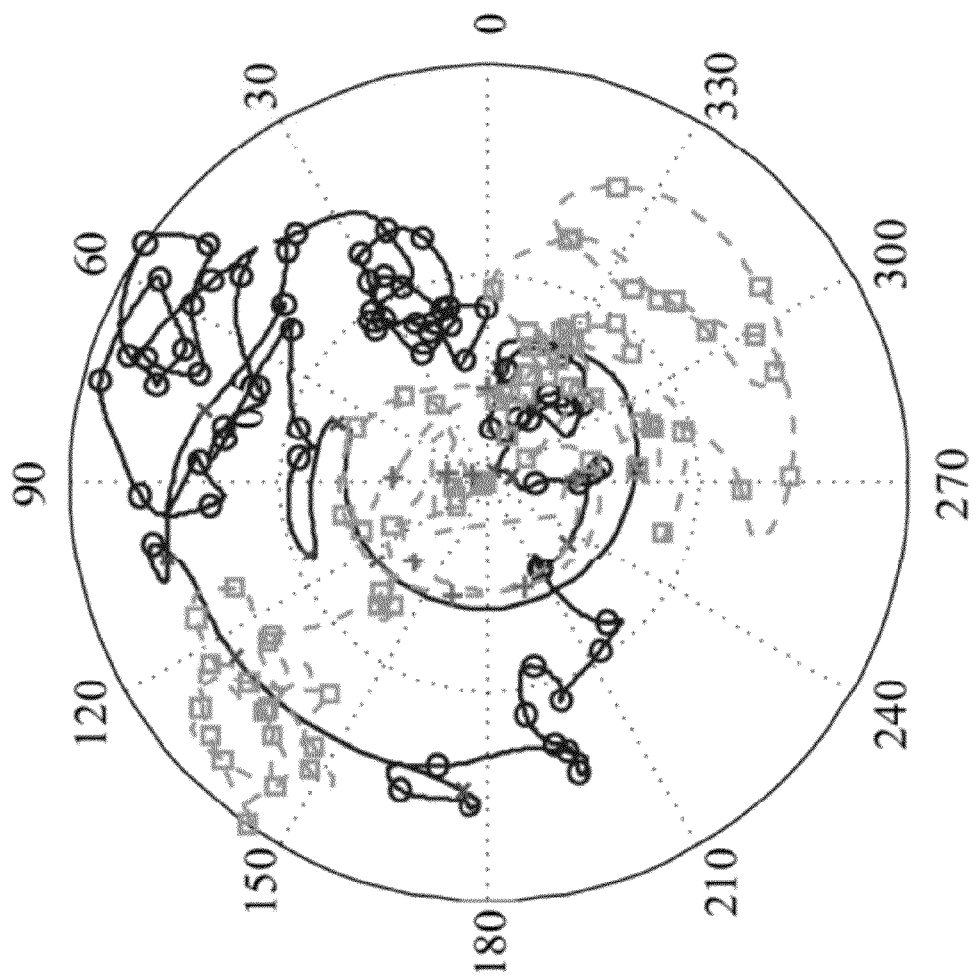
FIG. 14 is a simulated map of vectors over a constellation according to an embodiment of the present invention.

FIG. 14 shows the path of the vectors over the constellation in frequency, with the location of the sample points marked. It can be seen qualitatively that the vectors vary over the constellation space and appear uncorrelated. This demonstrates that a key can be generated with a dynamic system in a single time step by measuring multiple metrics over the frequency and spatial domain. Further, if nodes B and E were not part of the same receiver but node E was in fact an eavesdropper, it can be seen that the resulting keys generated would differ substantially.

From the foregoing it will be appreciated that, although specific embodiments of the invention have been described herein for purposes of illustration, various modifications may be made without deviating from the spirit and scope of the invention.

What is claimed is:

1. A method for generating data for use in cryptography or secure modulation, the method comprising:
   measuring at least two characteristics of a communications channel;
   converting the at least two characteristics into a first vector representation;
   addressing a constellation having at least two dimensions with the first vector representation to identify a first symbol associated with the first vector representation, wherein the constellation represents a plurality of regions, each region associated with a respective symbol;
   addressing the constellation having at least two dimensions with a second vector representation to identify a second symbol associated with the second vector representation;
   combining the first and second symbols to generate data; and
   storing the data in an electronic storage medium.

2. The method according to claim 1 further comprising:
   receiving an input signal;
   encrypting the input signal using the data; and
   transmitting the encrypted signal over the communications channel.

3. The method according to claim 1 further comprising:
   receiving an input signal;
   modulating the input signal in accordance with the data; and
   transmitting the modulated signal over the communications channel.

4. The method according to claim 1 further comprising characterizing the communications channel in terms of variability, complexity, periodicity, degeneracy, occupancy, or combinations thereof.

5. The method according to claim 4 wherein the act of measuring the at least two characteristics comprises using a channel sampling method and wherein the channel sampling method is based, at least in part, on the characterization of the channel.

6. The method according to claim 4 further comprising:
   generating an expiration time associated with the data based in part on the characterization of the communications channel; and
   storing the expiration time associated with the data in an electronic storage medium.

7. The method according to claim 4, wherein characterizing the communications channel comprises identifying an impulse response of the communications channel.

8. The method according to claim 1 wherein the first vector representation is based on an amplitude and a phase variation imposed on a test signal by the communications channel measured at a first time.

9. The method according to claim 8 wherein the second vector representation is based on an amplitude and phase variation imposed on a test signal by the communications channel measured at a second time.

10. The method according to claim 1 further comprising:
    measuring the at least two characteristics of the communications channel at a transceiver and generating weights based on the at least two characteristics using a linearization process, a normalization process, or a combination thereof.

11. The method according to claim 1 wherein each of the respective symbols includes a bit sequence.

12. A transceiver configured to generate data based on a communications channel, the transceiver comprising:
    a receiver configured to receive information over the communications channel;
    a channel measurement module coupled to the receiver and configured to measure at least two characteristics of the communications channel;
    a data converter configured to address a constellation having at least two dimensions with a vector representation based on the at least two characteristics of the communications channel to identify a symbol associated with the vector representation, wherein the constellation represents a plurality of regions, each region associated with a respective symbol and wherein the vector representation is based in part on the at least two characteristics of the communications channel, and wherein the data converter is configured to generate data based in part on the symbol associated with the vector representation;
    a transmitter configured to transmit a signal over the communications channel, wherein the signal is generated in part based on the data.

13. The transceiver according to claim 12 further comprising:
    a data validator configured to receive the data generated by the data converter and other data generated by another transceiver and transmitted over the communications channel, the data validator configured to compare the data to validate the data generated by the data converter.

14. The transceiver according to claim 12 further comprising:
    an encrypter coupled to receive an input signal, coupled to encrypt the input signal using the data, and coupled to output an encrypted signal,
    wherein the transmitter is coupled to the encrypter to transmit the encrypted signal received from the encrypter to another transceiver.

15. The transceiver according to claim 12 further comprising:
    a modulator configured to receive an input signal and modulate the signal in accordance to a spreading code including the data; and
    wherein the transmitter is coupled to the modulator and configured to transmit the modulated signal to another transceiver.

16. The transceiver according to claim 12 further comprising:
    a data storage module configured to store the data and couple the data to the transmitter.

17. The transceiver according to claim 16 wherein the channel measurement module is further configured to generate an expiration time associated with the data based in part on the a characterization of the communications channel and store the expiration time associated with the data in the data storage module.

18. The transceiver according to claim 12 wherein each of the respective symbols includes a bit sequence.

19. The transceiver according to claim 12 further comprising channel state storage coupled to the channel measurement module and configured to store a state of the communications channel, and wherein the data converter is configured to identify a periodic or degenerate state of the communications channel based in part on the, state of the communications channel.

20. A data generator comprising:
a cognitive controller configured to measure at least two characteristics of a communications channel using a sampling method and further configured to characterize the communications channel in terms of variability, complexity, periodicity, degeneracy, occupancy, or combinations thereof, and wherein the cognitive controller is configured to select the sampling method based in part on the characterization of the communications channel;
a weight generator configured generate weights based on the at least to characteristics using a linearization process, a normalization process, or a combination thereof;
a data converter configured to address a constellation having at least two dimensions with a vector representation to identify a symbol associated with the vector representation, wherein the constellation represents a plurality of regions, each region associated with a respective symbol and wherein the vector representation is based in part on the weights, and wherein the data converter is configured to generate data based in part on the symbol associated with the vector representation and Store the data in electronic storage; and
a data expiration generator configured to set a data expiration time for the data based at least in part on the characterization of the communications channel.

21. The data generator according to claim 20 wherein the channel measurement module is configured to measure an amplitude and a phase variation imposed on a test signal by the communications channel.

22. The data generator according to claim 20 wherein the cognitive controller is further configured to store a state of the communications channel in an electronic storage medium, and wherein the data converter is configured to identify a periodic or degenerate state of the communications channel based in part on the state of the communications channel.

23. The data generator according to claim 22 wherein the data generator is configured to discard data generated during the periodic or degenerate state of the communications channel.

24. The data generator according to claim 20 wherein the channel measurement module comprises an occupancy checker configured to identify an occupied portion of the communications channel and wherein the data converter is configured to discard vector representations associated with the occupied portion of the communications channel.

* * * * *